Sept. 3, 1935.   C. H. CLEVELAND   2,012,957
PRESSURE FLOW SYNCHRONIZER
Filed Aug. 5, 1933   3 Sheets—Sheet 1

Inventor
Charles H. Cleveland,

By Clarence A. O'Brien
Attorney

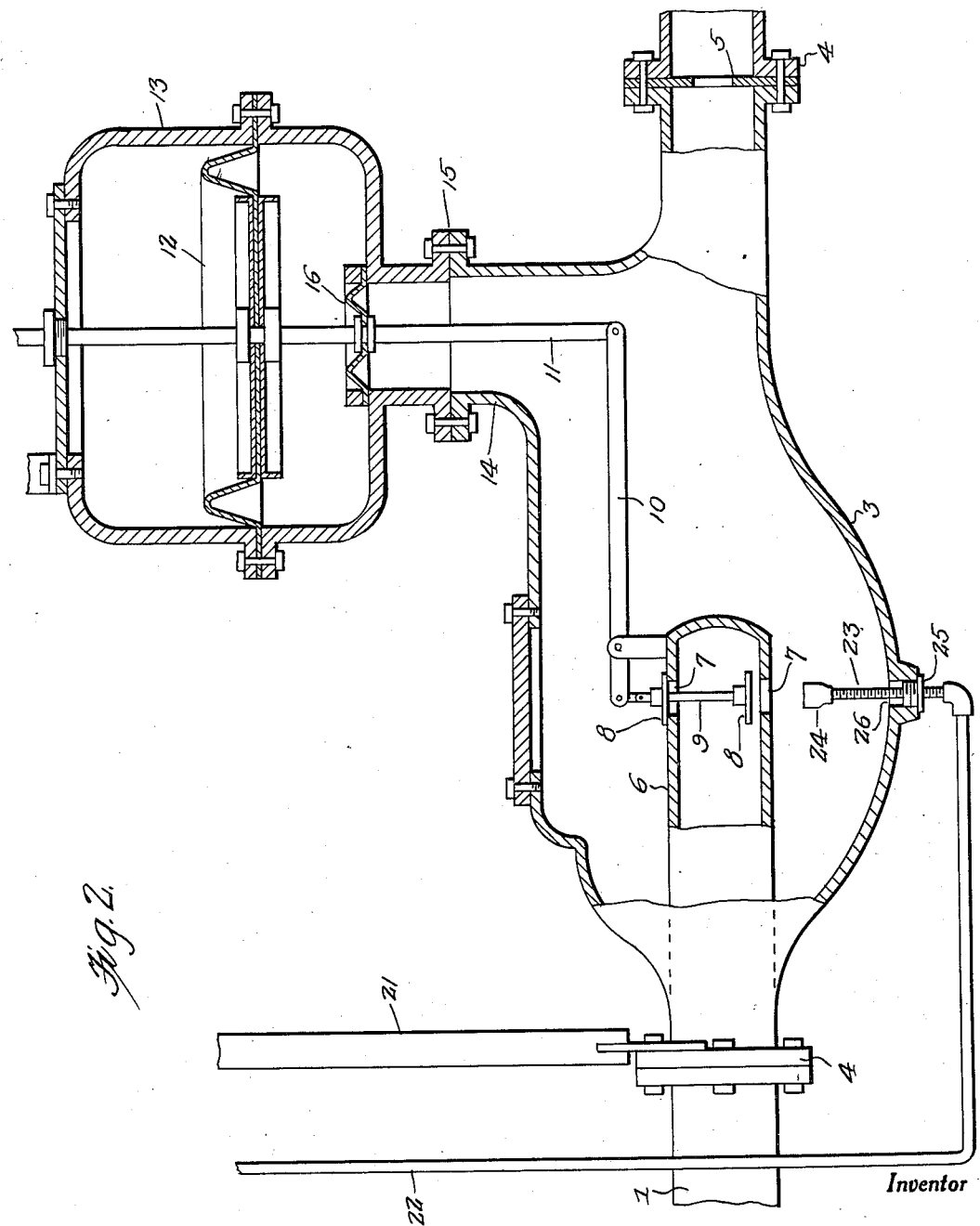

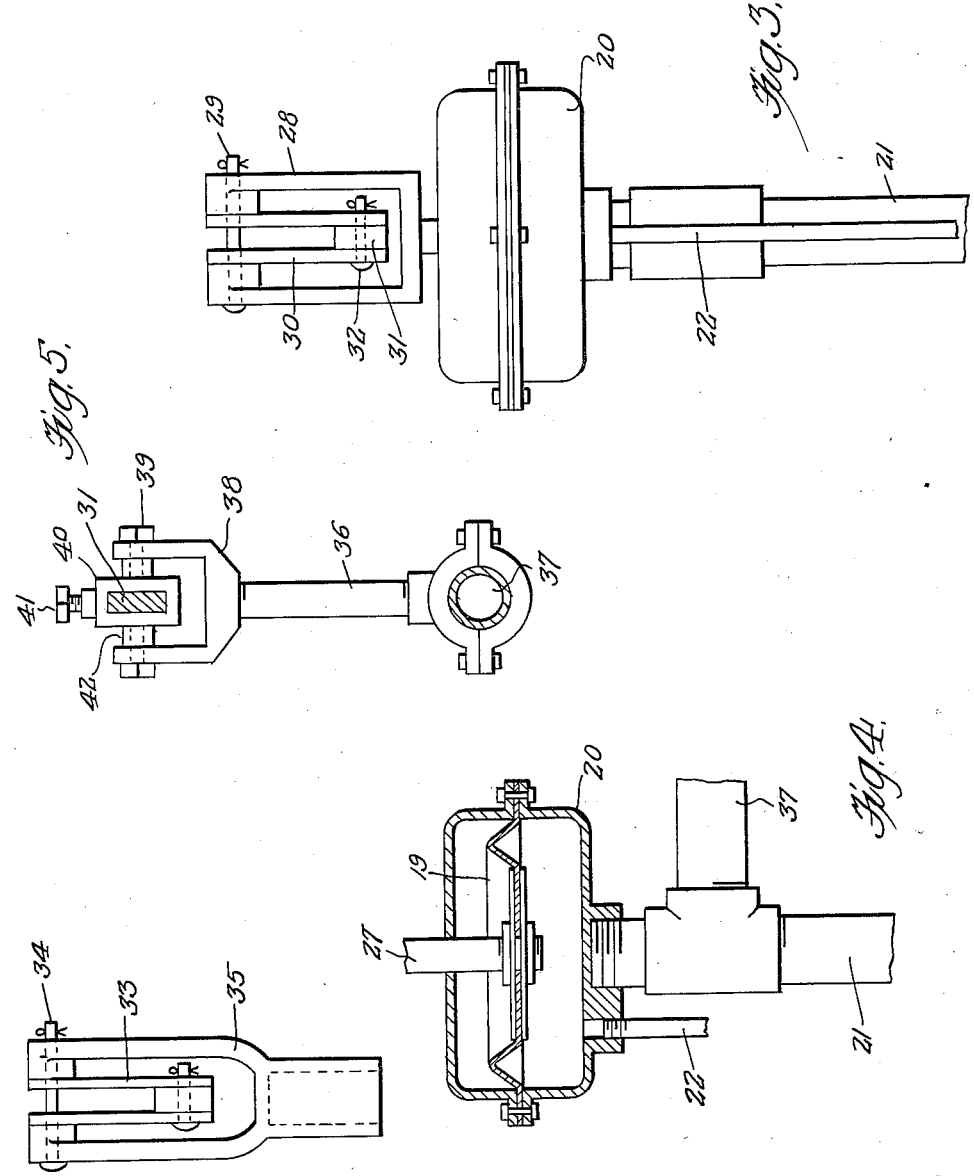

Patented Sept. 3, 1935

2,012,957

UNITED STATES PATENT OFFICE 2,012,957

PRESSURE FLOW SYNCHRONIZER

Charles H. Cleveland, Baton Rouge, La.

Application August 5, 1933, Serial No. 683,841

5 Claims. (Cl. 50—16)

This invention relates to a pressure flow synchronizer the general object of the invention being to provide means for maintaining a constant given pressure at a remote or distant point from the regulator station, regardless of the pressure required at the regulator itself. This is accomplished by making use of the velocity of the high pressure stream as it issues from the valve port, and in conjunction with this is used an orifice plate, Venturi tube or other means of restricting the flow and creating a slight increase or intermediate pressure between the point of restriction and the high pressure inlet.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 2 is a similar view, but showing parts in section.

Figure 3 is an elevation of the control diaphragm and its associated parts.

Figure 4 is a sectional view through the control diaphragm.

Figure 5 is a section on line 5—5 of Figure 1.

Figure 6 is an end view showing the means for connecting the lever to the master diaphragm stem.

Figure 1:
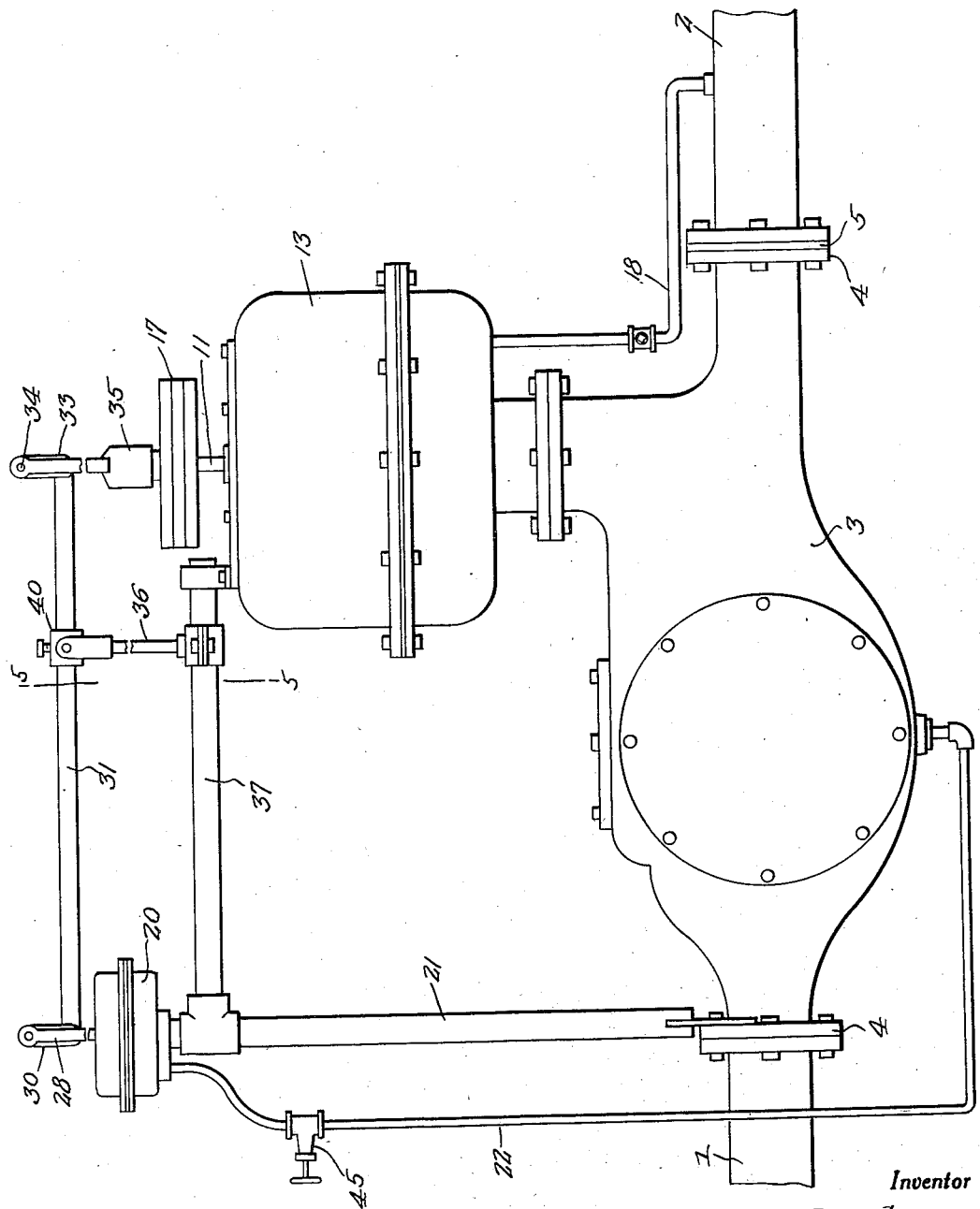
Figure 1 is an elevation of the apparatus.

In these drawings, the numeral 1 indicates the high pressure inlet line and the numeral 2 the low pressure outlet line, and the numeral 3 indicates the chamber forming member which is located between these lines and is connected thereto by the flanges and bolts, shown generally at 4. A reducing plate 5, or other means of restricting the flow at this point, is placed between the flanges at the rear end of the member 3 and the line 2, as shown in Figure 2. This restriction of the flow of fluid as it leaves the chamber 3 is of vital importance as it creates an intermediate pressure between itself and the valves and is the real secret of successful operation of the device.

The high pressure fluid is discharged from the line 1 into the member 3 by the extension 6 which is provided with the upper and lower ports 7 controlled by the valves 8 on the stem 9 which is pivoted at its upper end to the lever 10 which is pivoted to the lower end of the stem 11 of the master diaphragm 12 located in the casing 13 which is connected with the tubular extension 14 of the member 3 by the flanges and bolts 15. A small diaphragm 16 closes communication between the diaphragm chamber 13 and the member 3 and the stem or rod 11 passes through both diaphragms 12 and 16 and through the top of the casing 13 and has the usual weights 17 connected to its upper part, as shown in Figure 1. The lower part of the diaphragm chamber 13 is connected by the valve conduit 18 with the low pressure line 2, as also shown in Figure 1.

In carrying out my invention, I provide, in addition to the restriction device 5, a control diaphragm 19, placed in a casing 20 which is supported by the upright 21 from a front flange 4 and connect the bottom part of the diaphragm chamber 20 by a pipe line 22 with the member 3, a part of this line being composed of a threaded tube 23 having its lower end connected to the line 22 and its upper end having a funnel 24 attached thereto which is located under the lower port 7. This tube 23 is threaded through a plug 25 which is threaded in an opening 26 formed in the bottom part of the member 3. Thus the member 23 can be adjusted toward and away from the extension 6.

The stem 27 of the control diaphragm 19 is connected to a yoke 28, the upper part of which supports a pin 29 from which is suspended a pair of links 30, the lower ends of which are pivoted to a lever 31 by a pin 32. The other end of the lever 31 is pivoted between a pair of links 33 suspended on a pin 34 supported by the upper end of a yoke 35 which is connected to the upper end of the stem 11 of the master diaphragm. An upright 36 is clamped to a support 37 extending between the upright 21 and the top of the casing 13 and said upright 36 has a yoke 38 connected to its upper end which supports a pivot 39 for a rectangular-shaped member 40 through which the lever 31 passes. The lever is held in adjusted position in the member 40 by the set screw 41 and spacers 42, located on the pivot 39, prevent sliding movement of the member 40 on the pivot.

As will be understood, the master diaphragm and the valves 8 operate in the usual manner, but this operation is controlled by the diaphragm 19, and the invention is based on the principle that a drop in pressure or volume at any point in a pipe line causes an immediate increase in the velocity of flow toward the point from the source of supply, with a consequent drop in pressure and increase in velocity at the source of supply. Thus the slightest drop in pressure in the low pressure line will cause an increase in volume of the fluid passing through the ports 7 and this increase in volume or flow, due to the restriction 5 in the line of flow, causes a rapid building up of pressure in the chamber or space 3 between the valves 8 and the restriction 5, and this increase in pressure is transmitted through the pipe line 22 to the control diaphragm 19, causing this diaphragm to act, through the lever 31, on the master diaphragm or regulator and thus cause said master regulator to move the valves 8 so that the flow of fluid is increased or decreased as required to balance the pressure at the discharge point in the line.

I provide a control valve 45 in the line 22 which provides a restricted opening for the passage of the fluid which prevents surging in case of quick and violent changes in pressure and by providing the member 40 and the set screw 41, the pivot point of the lever 31 can be adjusted so that the lever action between the two diaphragms may be varied to give any desired range of pressure. In actual operation, pressure at the master regulator varies from base pressure to which it is adjusted at time of minimum flow, up to maximum discharge of regulator as demand on line increases.

The synchronizer can be installed and operated on any type of reducing regulator and its response to variation in flow is instant and positive. It also eliminates all need of placing additional weight on the diaphragm of the master regulator or removing the weight in order to maintain a constant pressure at the point of discharge. By making the tube 23 adjustable, the setting pressure take-off to any desired point in the stream of flow of any individual regulator is provided for and it also provides an adjustment to allow for increase or decrease of pressure applied to the control diaphragm.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. In combination with fluid pressure conduits including a high pressure line, a low pressure line, and a balanced control valve interposed between the two; of means in the low pressure line for restricting the volume of flow so as to create an intermediate pressure; said conduits being formed with a chamber for the intermediate pressure; a casing mounted above the conduit provided with a chamber and a diaphragm; a conduit connecting the chamber and the lower pressure line beyond said means to operate the diaphragm in response to changes in pressure in the low pressure line; a shell carrying a diaphragm; a conduit having means for preventing surges in pressure and connecting the intermediate pressure chamber with the shell; a pivoted lever above the diaphragms; one end of the lever connected with the second diaphragm and the other end connected to the first diaphragm whereby to influence the operation of the control valve in response to the intermediate pressure.

2. In a pressure regulator, a normally open valve, a diaphragm for operating said valve toward closed position in response to fluid pressure, means mounted above said diaphragm for biasing the valve toward open position, and means associated with the outlet of said valve for creating an intermediate pressure in said outlet whereby to increase the effect of said biasing means upon said valve with the increase in the demand from the outlet of said regulator.

3. In a pressure regulator, a normally open valve, a diaphragm for operating said valve toward closed position in response to fluid pressure, means mounted above said diaphragm for biasing the valve toward open position, and means associated with the outlet of said valve for creating an intermediate pressure in said outlet whereby to increase the effect of said biasing means upon said valve with the increase in the demand from the outlet of said regulator, said second mentioned means including a separate diaphragm cooperating with said first mentioned means.

4. In a pressure regulator, a normally open valve, a diaphragm for operating said valve toward closed position in response to fluid pressure, means mounted above said diaphragm for biasing the valve toward open position, and means associated with the outlet of said valve for creating an intermediate pressure in said outlet whereby to increase the effect of said biasing means upon said valve with the increase in the demand from the outlet of said regulator, said second mentioned means including a separate diaphragm cooperating with said first mentioned means, and a beam connected at one end to said separate diaphragm and to the first mentioned diaphragm at its other end.

5. In a pressure regulator, a normally open valve, a diaphragm for operating said valve toward closed position in response to differential fluid pressure, means mounted above said diaphragm for biasing the valve toward open position, and means associated with the outlet of said valve for creating an intermediate pressure in said outlet whereby to increase the effect of said biasing means upon said valve with the increase in the demand from the outlet of said regulator, said second mentioned means including a separate diaphragm cooperating with said first mentioned means, a beam connected at one end to said separate diaphragm and to the first mentioned diaphragm at its other end, and said second means including a flow restriction for retarding the effect of said intermediate pressure upon the second mentioned diaphragm.

CHARLES H. CLEVELAND.